UNITED STATES PATENT OFFICE.

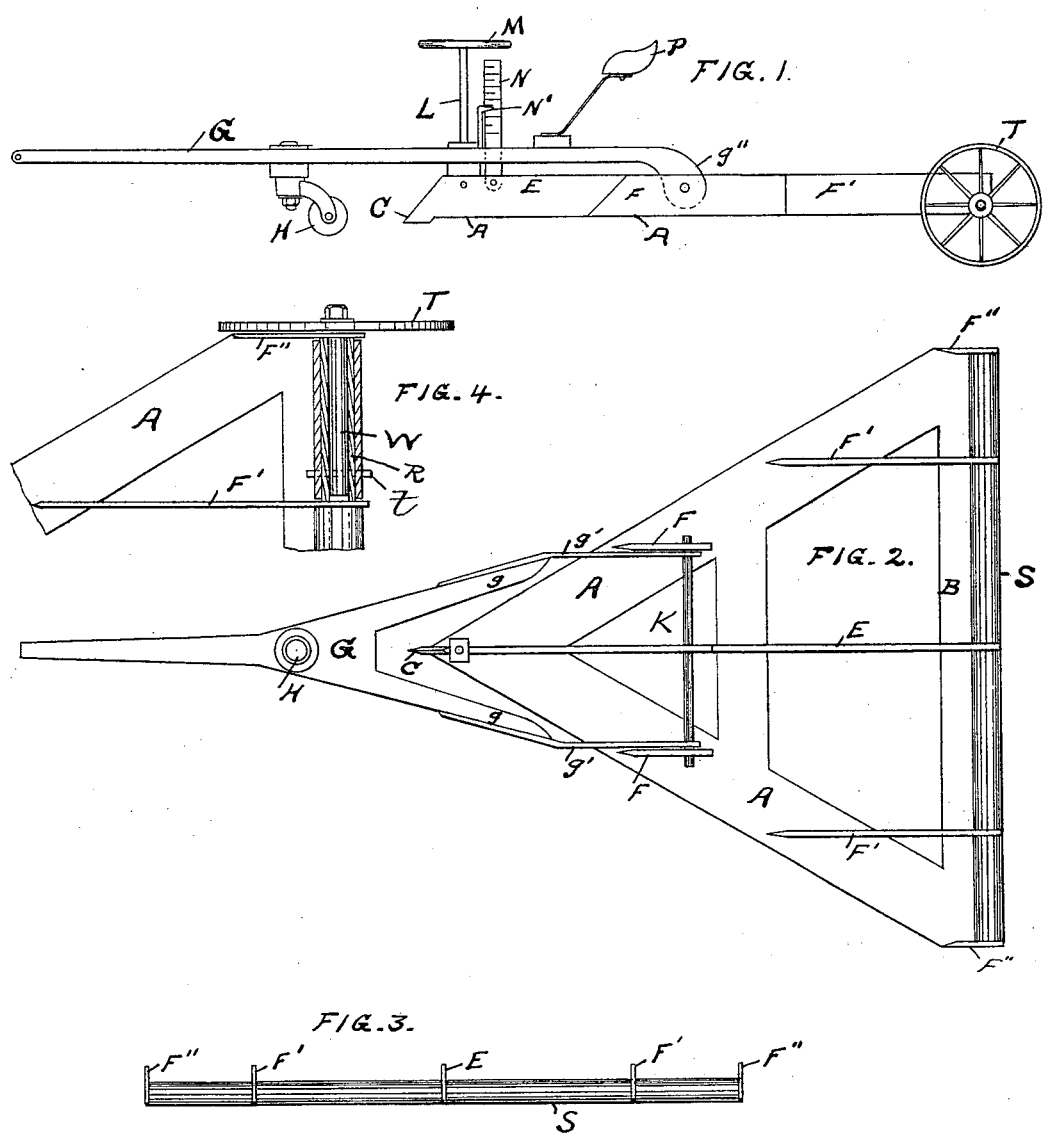

JOHN PFLEGER, OF MINNEAPOLIS, MINNESOTA.

MEADOW-PLANER.

SPECIFICATION forming part of Letters Patent No. 367,058, dated July 26, 1887.

Application filed March 15, 1887. Serial No. 231,053. (No model.)

*To all whom it may concern:*

Be it known that I, JOHN PFLEGER, a citizen of the United States, and a resident of Minneapolis, county of Hennepin, and State of Minnesota, have invented a certain new and useful Meadow-Planer, of which the following is a specification, reference being had to the accompanying drawings.

Low-lying wild prairie land is very productive of wild grass, which, when cut and cured, makes excellent hay; but in most cases it is very difficult to cut the grass from such ground, and in many instances it is quite impossible to do so. The reason for this lies in the fact that such wild meadow land is very rough and full of innumerable grass buttocks or root-clusters of the bunches of wild grass. These root-clusters or buttocks will rise sometimes a foot or more from the main level of the ground.
From the tops of the same grow annually a luxuriant growth of wild grass. In such meadows there is ofttimes, in patches, more or less of an undergrowth of shrubs and small saplings. In the higher patches there will also be ant-hills and gopher-hills, and in the lowest parts, if near a body of water, there are apt to be musk-rat houses. Over such land in its natural state it is utterly impossible to cut the grass with a mower, and almost equally impracticable to get it off with a scythe. This remains true even after the land has been drained, for it has not hitherto been practicable to get rid of the irregularities and protruding bunches of grass-roots except by plowing the land and re seeding it. The result is that such land goes entirely to waste, save only in those few instances where the grass is pastured off by stock.

The object of my invention is to reclaim all this waste land and put it into such condition that the grass can be as freely cut therefrom by the mower as from the upland tame grass meadow. I accomplish this result by leveling down all the irregularities and protuberances described by the means of my invention, which consists of the machine shown in the drawings, and hereinafter fully described, and particularly claimed.

In the drawings, like letters referring to like parts, Figure 1 is a side elevation of my machine as it appears when being removed from one meadow to another, and also as it appears in use, except that when in use the truck-wheels are removed. Fig. 2 is a plan view of the machine with the seat and the point raising and lowering mechanism as it appears when in use. Fig. 3 is an end or rear view of the same; and Fig. 4 is a view, partly in plan and partly in section, of a fraction of the machine, showing the way in which the truck-wheels are applied.

The body of the machine is in shape like an isosceles triangle, consisting of the base B and the sides A A', meeting at the common point, C. The sides A A' are composed of flat pieces of heavy steel or steel-edged iron, and the outer edges of the same are sharp. The two meet in front on a knife-edged sloping line, and the point C is a drawing-point projecting an inch or two below the level of the side pieces of the shears. This makes up what I call the "planer-share" or the "bed-share" of the meadow-planer, and is the essential element in my machine.

D is a central cross-brace of heavy iron. Several of such cross-braces may be used, if found necessary. Along the median line from the point C to the rear end of the machine I place a longitudinal brace, E, which is preferably composed of two pieces of flat iron bolted together, but may of course be made of one. The point C is preferably attached to the forward end of this brace E. On the flat bed-shares, parallel with the line of draft, I place the vertical shares F, F', and F'', all of which have sharp sloping edges in front. More or less of these vertical shares may be used, as found desirable.

G is the tongue or forward truck-body resting on the swiveled caster-wheel H. This tongue is provided with the rearwardly-extending bifurcated arms g, and to these are rigidly attached the metallic extensions g', curved downward into ear-like projections or lugs g'' at their extremities. Through coincident holes in the lugs g'', the shares F, and the brace E passes the rod K, pivotally connecting the tongue-truck with the bed-share. In a screw-threaded nut fixed in a cross-bar on the tongue-truck is placed a hoisting-screw, L, provided with a hand-wheel, M. The lower extremity of this screw L is attached to the forward end of the median brace E by any suitable connection which will allow it to turn freely therein, but not to be withdrawn therefrom. By this screw the forward end, C, of the planer may be raised or lowered at will and set to any desired pitch or draw-line. A gage-plate or indicator, N, may be attached to the planer, and a pointer, N', be fixed on the tongue-truck, whereby the depth of draw or the distance of the point C below the truck-frame may be always before the driver's eyes. A seat, P, is attached in any suitable way to the tongue-truck.

The central brace, E, and the vertical shares F' and F'' extend rearward a slight distance beyond the rear edge of the base or rear plate, B, of the planer. Through coincident openings in these rearward extensions I place a small hollow tube or gas-pipe, R, extending from side to side of the planer. This serves to strengthen the rear of the machine and to give a convenient means of attaching a sectional roller and the side truck-wheels. On the gas-pipe or tube R, I place a series of rollers, S, one each between each pair of rearward extensions. These rollers S are of just large enough diameter to bring their peripheries flush or a trifle below the level of the rear plate, B. The function of this sectional roller is to facilitate backing. Otherwise the rear plate and vertical shares F' and F'' would dig into the ground whenever backing was attempted.

T are truck-wheels, and W are spindles for the same. Whenever I want to move the planer from one field to another or along the road, I insert the spindles W, carrying the wheels T, in the extremities of the tube R, and secure the two rigidly together by a coupling-pin, t. The planer then rides free from the ground.

The operation of my machine is as follows: The truck-wheels having been removed, the rear of the planer rests flat on the ground. The point C is then lowered to make the planer draw to any required depth, and power is applied to the tongue-truck. As it is drawn forward, it will catch and cut off all obstructions. Its wedge shape and its downward drawing-point will prevent it from rising away from its work, and the knife-edges of shares will cut off the protuberances. The body of the planer will act in a measure as a drag to fill up the depressions by the protuberances cut off; but if this is found insufficient for the purpose, the planer may be followed by a harrow or a drag; or a flexible harrow or drag may be attached directly to the rear of the planer. In case the point of the planer gets caught fast in a stump, or the sides get wedged between large stones or stumps, it may be readily disengaged therefrom by backing and by the elevating-screw L. In case the driver's weight added to its own be insufficient to keep the planer down to its work, it may be further weighted by a box full of stones, or in any other suitable way.

All the parts of the planer should be made very heavy and strong. It should be composed of iron and steel throughout, and all the parts should be well braced and firmly bolted together.

My machine is simple and cheap and will do the work desired. It accomplishes results never, so far as I know, hitherto attempted, and is intended to reclaim for hay-making waste land in different parts of the world.

What I claim, and desire to secure by Letters Patent of the United States, is as follows:

1. An instrument for leveling wild meadow-land by cutting off its protuberant buttocks of wild grass and other irregularities, which consists, essentially, in an acute-angled triangular or wedge shaped flat metallic share provided with sharp exterior edges, the apex of the wedge constituting the front end of the share, substantially as set forth.

2. A wild-meadow planer consisting of an acute-angled triangular or wedge shaped flat metallic share provided with sharp exterior edges, the apex of the wedge constituting the front end of the share, and a downwardly projecting or drawing metallic point attached to or forming a part of the under side of the apex of the wedge, substantially as and for the purpose set forth.

3. In combination, the planer A B C, the tongue-truck G, provided with caster-wheel H, pivotally attached to said planer, hollow axle R, attached to the rear of said planer, truck-wheels T, spindles W, and coupling-pin t, as and for the purpose set forth.

4. In combination, planer A B C, central or median brace, E, and vertical shares F, F', and F'', all provided with extensions slightly to the rear of the rear plate, B, of the planer, bearing rod R, passing through coincident openings in said rearward extensions, and the sectional roller S, supported on said rod, substantially as and for the purpose set forth.

5. The wild-meadow planer described, consisting of the bed-share A B C, provided with a drawing-point projecting slightly below the level of the same, the vertical shares F F' F'', the sectional roller S, the tongue-truck G, pivotally attached to the planer and provided with the caster-wheel H, the raising and lowering screw L, and the gage N, as set forth.

6. The wild-meadow planer described, consisting of the bed share or planer A B C, provided with cutting-edges on the flat metallic side pieces, A, and a downwardly projecting or drawing point at C, central cross-brace, D, vertical shares F, F', and F'', rigidly secured to the bed-share, as set forth, median brace E, cross bearing rod and hollow axle R, sectional roller S, tongue-truck G, with caster-wheel H, means for pivotally connecting the tongue-truck to the bed share or planer, the screw L, with hand-wheel M, working through a nut fixed in said tongue-truck and attached to the front of the planer-gage N, and indicator N', substantially as set forth.

JOHN PFLEGER.

In presence of—
J. F. WILLIAMSON,
EMMA F. ELMORE.